Sept. 11, 1951  C. J. ALLEN, JR  2,567,685
METHOD OF RECONDITIONING CRANKSHAFTS AND THE LIKE
Filed June 13, 1951
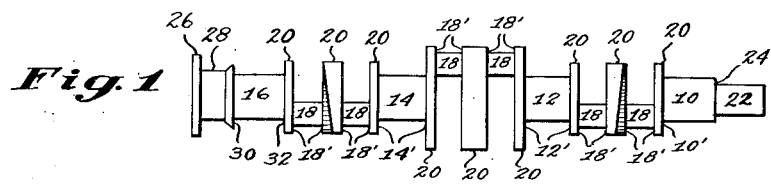
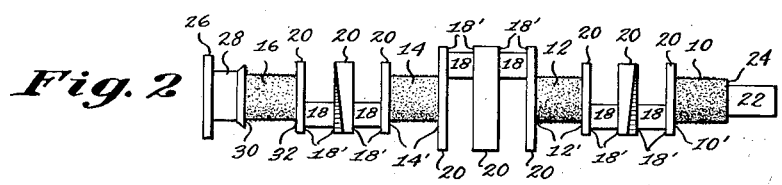
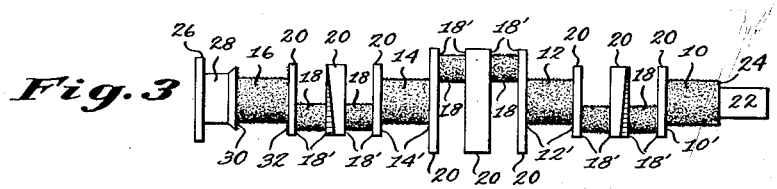
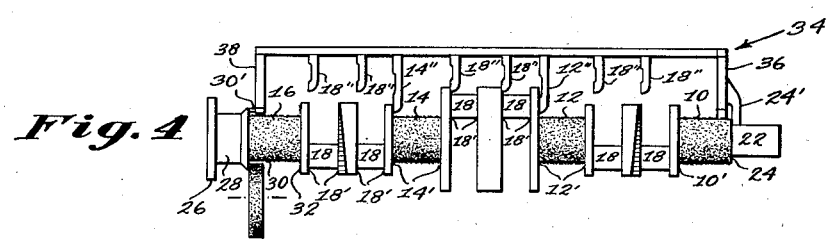
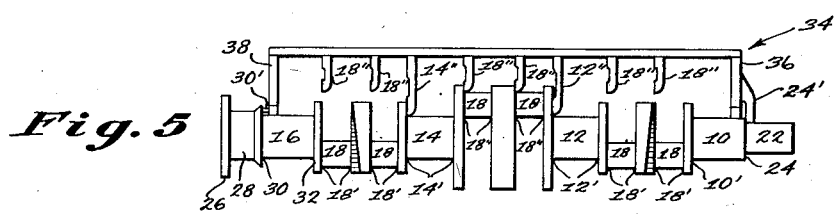
Inventor
CHARLES J. ALLEN, JR.
By
Parrott and Richards
Attorneys Patented Sept. 11, 1951

2,567,685

UNITED STATES PATENT OFFICE 2,567,685

METHOD OF RECONDITIONING CRANK-SHAFTS AND THE LIKE

Charles J. Allen, Jr., Charlotte, N. C., assignor to American Crankshaft Company, a corporation of North Carolina Application June 13, 1951, Serial No. 231,388

4 Claims. (Cl. 29—6)

This invention relates to a method for reconditioning crankshafts and the like, which is adapted particularly for reconditioning worn automotive crankshafts, and by which such crankshafts may be reworked accurately on a production basis to standard specifications and at the same time provided with physical properties fully comparable with, and in many cases superior to, the original crankshafts. This is a continuation-in-part of my copending application Serial No. 91,939, filed May 7, 1949, and allowed December 15, 1950, and now abandoned.

As is well known, automotive crankshafts are commonly formed with a plurality of main journal portions and thrust bearing surfaces adapted for mounting in an engine block, and further comprise a series of rod throws projecting in a balanced pattern for receiving and converting motion of the engine pistons for rotation of the crankshaft.

After extended or particularly severe use, the journal portions and other bearing surfaces of the crankshaft wear or become damaged so that they will not operate satisfactorily any longer and must be replaced. The crankshaft is one of the common points of failure in automotive engines, particularly where the engine is subjected to heavy duty or constant use, or where adequate lubrication of the engine is neglected. The replacement of automotive crankshafts accordingly represents a frequently occurring maintenance job, the expense of which is substantially reduced if the worn crankshaft requiring replacement can be satisfactorily reconditioned for reuse.

One method heretofore in use for reclaiming the worn crankshafts removed from automotive engines, so that they may be reused, consists of grinding the main journals and rod throws of the worn crankshafts to a uniform undersize with the idea that the bearing surfaces will be worked true again in this manner, and that by using undersize bearings such crankshafts can be installed in an engine again for reuse. This method has not proved really satisfactory, however, for a number of reasons. In the first place, the thrust bearing surface cannot be reworked by undersize grinding, so that any lateral play due to wear at this point in the worn shaft is left uncorrected, and remains in the reconditioned underground shaft to cause mechanical difficulty when the reconditioned shaft is installed in an engine block. Moreover, undersize grinding has the further important disadvantage of dissipating the worn shaft so that usually a shaft cannot be reconditioned more than once by this method.

It has also been previously proposed to recondition a worn crankshaft by methods for depositing metal, such as metalizing or plating processes. Metalizing is not practical or useful for this purpose because the metal deposited by this method is only mechanically bonded in the nature of a sleeve on bearing surfaces of the crankshaft and will often break loose under the operating conditions to which a crankshaft is subjected. Also, metalizing as well as plating processes require undergrinding of the worn shaft before any metal is deposited which is undesirable. Furthermore, plating processes likewise result in only mechanically bonding the deposited metal on the worn shaft, and in addition have been found to be entirely too expensive for use in reconditioning crankshafts.

According to the present invention, the above noted difficulties and disadvantages of prior methods are avoided entirely by a method of rebuilding the worn crankshafts to standard specifications so that they may be replaced in an engine block just as a new crankshaft would be installed. The method of the present invention for rebuilding or reconditioning the worn crankshafts, briefly described, comprises fusing a surface coating of metal on the crankshaft bearing surfaces by electric welding or the like, and then grinding these surface coatings so that the standard specifications for the original shaft are duplicated in the resurfaced shaft. I am aware that it has heretofore been common to build up a worn shaft surface by welding or the like, and then grind the welded surface smooth with the original shaft. Insofar as I know, however, no practical method has even been developed heretofore for applying this technique to rebuilding or reconditioning crankshafts, mainly because of the extreme difficulties encountered in dealing with the form and arrangement of a crankshaft.

It is well known, for example, that the machining of crankshafts presents unusual difficulties, even in the original machining of new crankshafts, because of the projecting disposition of the rod throws and the resulting problem of working the main journals and rod throws true in relation to each other despite the marked tendency of the shaft to spring and therefore run out of true while it is being machined. These problems are magnified even more in attempting to rebuild a worn crankshaft by welding and re-grinding, because the heat of the welding operation introduces another source of warping and dimensional change in the crankshaft which must be controlled before satisfactory results can be obtained; and furthermore, the welding operation destroys the identity of the original bearing surfaces so that they must be relocated as well as ground in the process of rebuilding according to the present invention.

The method of the present invention by which these difficulties are overcome so that the worn crankshafts may be reworked accurately, and with such facility that the method may be carried out on a production basis, is described in detail below in connection with the accompanying drawing in which:

Fig. 1 is a more or less diagrammatic representation of a conventional form of crankshaft which might be reconditioned by the method of the present invention after it became worn;

Fig. 2 is a corresponding illustration of the crankshaft shown in Fig. 1 after the main journals and thrust bearing surfaces have been resurfaced by welding;

Fig. 3 is a further illustration of the crankshaft after the rod throws have also been resurfaced;

Fig. 4 is a further illustration showing the crankshaft after the rod throws have been rough ground and illustrating the manner in which one of the thrust bearing surfaces may then be ground to standard specifications for overall length in relation to the neck of the crankshaft and the rough ground rod throws; and Fig. 5 is a further illustration of the manner in which the finish grinding of the crankshaft is checked.

The crankshaft illustrated in Fig. 1 of the drawing is of the type incorporating four main journals as at 10, 12, 14 and 16, and six rod throws as represented at 18. The rod throws are disposed in relation to the main journals in the usual manner by crank portions as at 20 by which the rod throws are arranged with a projecting disposition in relation to the main journals, and it will be understood that the rod throws are arranged in a balanced pattern such as is conventionally used in crankshafts so that they will run smoothly.

The front end of the crankshaft shown in Fig. 1 as indicated at 22 is of reduced diameter so that it is adapted for carrying a timing gear in the usual manner, and this timing gear portion 22 at the front end of the shaft extends directly adjacent the front main bearing 10, the shaft being necked at this point as indicated at 24 to provide for the reduction in diameter. At the rear end of the crankshaft the flywheel flange is indicated at 26 and the oil seal portion at 28.

Thrust bearing surfaces for the crankshaft shown in Fig. 1 are indicated adjacent the oil seal portion 28 and rear main journal 16 at 30 and 32, although it will be recognized that these thrust bearing surfaces in some instances are arranged in relation to one of the other main journals. The extent of the other main journals and of the rod throws is defined by cheek faces formed on the crank portions 20 as at 10', 12', 14' and 18'.

In carrying out the method of the present invention for rebuilding or reconditioning a crankshaft, such as is shown in Fig. 1, after it has become worn, the first step after cleaning the crankshaft adequately by shot blasting or the like, and preheating it if desired, is to fuse a surface coating of metal on the bearing surfaces as previously mentioned by welding or the like. It is important that the surface metal coatings be actually fused on the bearing surfaces, and electric welding will usually be found best adapted for this purpose. An actual fusion of the surface metal coating on the bearing surfaces is important because it provides a coating integrated with the crankshaft body which may be reworked as a solid piece of metal, as distinguished from metal that is merely deposited as by metalizing or plating processes and therefore only mechanically bonded to the shaft, as previously noted. The step of preheating before welding is not essential, but it does have a good effect in minimizing micro-cracking and reducing the tendency of the shaft to warp and buckle during welding, and in some cases offers substantial advantage. The degree of preheating employed will depend on the size and type of crankshaft being handled, but will usually fall within the range from 100° F. to 700° F.

In carrying out the welding operation, the main journals 10, 12, 14 and 16, together with the thrust bearing surfaces 30 and 32, are resurfaced first (compare Fig. 2). Preferably, weld metal of mild steel is applied first to build up the fillets and circle the oil holes of these main bearings. This lessens the possibility of cracking at the fillets during subsequent processing, and provides for restoring the oil holes by drilling and counterboring. The resurfacing of the main journals is then completed with a hard surfacing weld metal selected to give the wearing properties desired.

The crankshaft may be disposed in any convenient manner for application of the surface coating by welding, although usually this operation can be carried out most rapidly by mounting the crankshafts so that they may be rotated as the coating is applied by welding, and by moving the welding apparatus longitudinally of the bearing surface so that it is progressively covered as the crankshaft rotates. In order to prevent undue warping or shrinkage of the crankshaft during this welding operation it is helpful to apply the surface coating to the bearing surfaces alternately from each end, i. e., if a surface coating is applied first to the main bearing journal 10 at the front end of the crankshaft, then a surface coating would next be applied to the main journal 16 at the rear end of the shaft, then to the main journal 12, and then to the main journal 14. This procedure has the effect of tending to confine the welding heat inwardly of the shaft and has been found to have a good effect in avoiding warping and shrinkage during welding.

Another step employed according to the present invention for avoiding warping and shrinkage of the crankshaft during welding is the use of a spring loaded chuck or tail stock to mount the crankshaft for rotation during welding. This feature has the effect of allowing dimensional changes due to the welding heat to take place freely so that there is no tendency for the shaft to buckle or warp as is true when it is mounted between rigid centers for rotation.

In applying the surface coating to the main journals by welding as just described above, it will be recognized that the weld metal will be laid on the bearing surfaces in the form of a bead and that by traversing the welding fixture at a proper rate in relation to the rotating crankshaft, this bead of weld metal will be applied in a spiral pattern so that the bearing surface will be covered by a continuous surface coating when its length has been traversed by the welding tool.

After a surface coating has been applied to the main journals by welding as just described above, the crankshaft is then checked for alignment. This is done by supporting the crankshaft for rotation at the front timing gear portion 22 and the rear oil seal portion 28, and checking or testing the alignment of the crankshaft during rotation at one of the intermediate main journals 12 or 14 or both, and at the flywheel flange 26, with an indicator. The intermediate main journals 12 and 14 will of course be covered at this point with an unfinished surface coating of weld metal, but this surface coating will be sufficiently smooth to allow the alignment to be checked adequately for practical purposes, particularly where it is a small shaft that is being reworked, in which any variations caused by warping or shrinkage during the welding operation are not apt to be great in any case.

In the larger shafts, which may be classed as those having five or more main journal bearings, or having journal bearings larger than 2¾" in diameter, where the problem of warping and shrinkage is apt to be more pronounced, the alignment step is preferably carried out more exactly by surface coating only approximately half of each main journal, or at least a main journal at one end of the crankshaft together with one of the intermediate main journals. By this procedure, the shaft can be aligned with reference to the remaining original halves of the main journals so that a rough grind can be taken on the surfaced half. Surface coating of the remaining portions of the main journal bearings can then be completed, and a corresponding rough grind taken in due course on these portions in relation to the portions originally surfaced and ground.

In any case, the alignment of the crankshaft is checked in connection with surface coating of the main journal portions by welding, and if any misalignment is found the crankshaft is straightened in a press or the like while the shaft is still hot until its alignment is corrected within acceptable limits.

When the main journals of the crankshaft have been resurfaced and the crankshaft has been checked for alignment as noted above, the rod throws 18 are then resurfaced by welding in the same general manner. Here again it is helpful to apply the weld metal to the bearing surfaces alternately from each end to avoid warping and shrinkage, although the operation can be carried out successfully by welding the rod throws in any order desired if other more important considerations require this to be done. After the rod throws have been completely resurfaced, the welding operations will have been completed (as in Fig. 3), and the crankshaft should then be heat treated to stress-relieve it, and preferably also shot blasted again to remove all welding scale. The shot blasting step at this point also appears to have a good effect in further stress-relieving the shaft.

The completely resurfaced shafts may then be more closely aligned by mounting them in a grinder with the front or neck end of the shaft disposed in a chuck arranged for off-center adjustment, and adjusting this chuck as necessary to make the original oil seal surface 28 run true so that an aligned rough oversize grind may be taken on the adjacent main journal 16. In a similar manner, the front main journal 10 may be rough ground oversize in alignment with the timing gear portion 22 by adjusting the grinder chuck on-center. With these surfaces in respective alignment, the entire length of the shafts may be roughly aligned within good working limits by supporting them for rotation at the rough ground journals 10 and 16, as in V-blocks, and straightening them until the above noted oil seal surface 28 and the timing gear portion 22 both run true.

The roughly aligned shafts are then mounted in a grinder again and a rough grind is taken to a suitable oversize on all of the rod throws first. This grinding of the rod throws first is directly contrary to normal grinding procedures, but is important in obtaining satisfactory results according to the present invention. It is also important that this rough grind on the rod throws be taken for the full extent of their width between the original cheek faces 18' so that the fillets of weld metal formed adjacent the cheek faces are cut. The importance of this step is in further relaxing any stresses set up in the crank portions 30 by the weld metal laid down adjacent the cheek faces 18' during the welding operation, so that if the crankshaft has been distorted at all by these stresses the distortion will be relieved, and the shaft will relax to a normal position. If this is not done before grinding of the main journals is completed, it will be apparent that the main journals could be thrown out of alignment with the rod throws by any relaxation which occurred when the rod throws were subsequently ground. It would of course be possible to rough grind the main journals sufficiently oversize to allow for this relaxation upon later grinding of the rod throws, but such a procedure is less advantageous, and the main journals must be finished after the rod throws in order to obtain dependable results in any case.

In addition, grinding of the rod throws to the original cheek faces restores these cheek faces as reference points for use in locating the thrust bearing surfaces accurately as they are reground. This is illustrated in Fig. 4 of the drawing which illustrates the grinding of the thrust bearing surface 30 by use of a reference fixture 34. Any suitable type of reference fixture or other measuring device desired may be used for this purpose, but the fixture illustrated at 34 in Figs. 4 and 5 has been found particularly convenient.

This fixture 34 comprises a frame structure as shown, on which gauge arms 18" are located as feelers for one of the cheek faces 18' of each of the rod throws 18, together with feeler arms 12" and 14" for one of the cheek faces 12' and 14' of each of the intermediate main journals 12 and 14. At each end of the reference fixture 34, supporting legs 36 and 38 are arranged which may have yoke-shaped feet or the like (not shown) for supporting the fixture 34 on the front and rear main journals 10 and 16. A further feeler arm 24' is associated with the supporting leg 36 at the front end of the reference fixture 34 for feeling contact with the neck of the crankshaft 24, and on the rear supporting leg 38 of the fixture 34 a reference pin 30' is arranged for feeling contact with the thrust bearing surface 30.

It will accordingly be seen that the distance between the feeler arm 24' and the reference pin 30' can be used as a length gauge from the original neck 24 of the crankshaft to check the lateral position of the thrust bearing surface 30 accurately with the overall length of the shaft, while the reference arms 18" allow checking of the lateral position of the thrust bearing surface 30 accurately in relation to each of the rod throws 18, which must have a relative location within standard tolerances in order to accommodate proper perpendicular disposition of the connecting rods in the cylinder bores of the engine block. By the procedure just described above, the thrust bearing surface 30 can be located readily and with facility in accordance with standard specifications in relation to the rough ground rod throws 18 and with the required lengthwise dimension from the neck 24 of the crankshaft. That is, the rod throws and thrust bearing surfaces can be located in this manner so that a proper lineal relation of the rod throws is established not only for the rod throws with respect to each other but also for the rod throws and thrust bearing surfaces in relation to the required lengthwise dimension from the neck of the crankshaft. The lineal relation of the rod throws with respect to each other can usually be established within acceptable limits by the rough grinding of the rod throws to the original cheek faces as noted above. In some cases, however, it may be necessary to build up the rod throws during the resurfacing operation to such an extent that the original cheek faces are obscured, and when this is so the rod throws may be located by first taking a rough grind on one of the thrust bearing surfaces to the required lengthwise dimension from the neck of the crankshaft and then locating the rod throws for rough grinding from the rough ground thrust bearing surface by use of the above described reference fixture 34 or the like. In any event, the important point is that the rod throws must be located properly both in lineal relation to each other and in lineal relation to the over-all length of the shaft, so that an interrelated location of the thrust bearing surfaces must be provided for.

Location of the thrust bearing surface 30 in this manner is perhaps the most important phase of the process of the present invention, because it is in this step that the crankshaft is restored dimensionally to standard specifications, notwithstanding the dimensional changes which always result to some extent during the welding. In the great majority of cases, the dimensional change resulting from the welding operation will amount to only a slight shortening or lengthening of the shaft, for which compensation may be made readily in grinding the thrust bearing surface 30. In some few cases, the dimensional change encountered may be large enough so that it cannot be taken care of in this manner. When this occurs, correction can be made either by applying additional metal by welding at the neck 24 of the crankshaft to build it out farther, and then relocating the neck 24 and thrust bearing surface 30 to balance out the dimensional change; or if more convenient, by using a suitable press to apply pressure at the ends of the shaft and correct the dimensional change within acceptable limits in this manner. In any case, the process of the present invention allows the crankshaft to be checked and corrected dimensionally with great accuracy and facility.

After the thrust bearing surface 30 has been ground with the proper lateral disposition, the remaining thrust bearing surface 32 may then be readily ground and checked to the required dimension from the first thrust bearing surface 30, and all of the main journals may then also all be rough ground by use of the reference fixture 34 as illustrated in Fig. 5. When all of the main journals and rod throws and thrust bearing surfaces have been properly located and rough ground in this manner, a finish grinding step may then be carried out to complete the reconditioning of the shaft, and in this step it is still important to observe the procedure noted above of grinding the rod throws before the main journals and thrust bearing surfaces in completing the finsh grinding of the shaft. This is particularly true when any deviation from this procedure has been made in rough grinding the main journal as suggested above, for in this finishing step, the finishing of both the main journals and the thrust bearing surfaces must follow the finishing of the rod throws so that all relaxation of the shaft from grinding of the rod throws takes place before the main journals and thrust bearing surfaces are finished, and so that the finished location of the main journals and thrust bearing surfaces may be checked properly from the finished lineal relation of the rod throws.

When finish grinding of the crankshaft is completed, the rebuilt crankshaft is ready for final balancing and inspecting, after which it may be supplied for use. The resulting reconditioned crankshafts, as previously mentioned, are fully comparable in workmanship and physical properties with the original crankshafts, and in many cases possess superior physical properties. For example, very few new crankshafts are given any surface hardening treatment at all, except where they are intended for very heavy duty, as in large Diesel engines and the like. By the method of the present invention, however, it is possible to rebuild the bearing surfaces with any type of weld metal desired, and by using a hard surfacing weld metal a hard surface coating can be obtained on the bearing surfaces in combination with a relatively ductile core provided by the metal of the original crankshaft, which results in excellent wearing properties.

An even more important feature of the process of the present invention, however, is that it allows the crankshafts to be reworked to standard specifications on a production basis. By making this possible, it allows worn crankshafts to be fully reclaimed for comparable use with a new crankshaft, so that an exceptional saving is effected which is not only substantial in ordinary times but may become critical during times of war and the like when scarcity of raw materials becomes acute.

I claim.

1. The process of reconditioning worn automotive crankshafts and the like which comprises fusing a surface coating of metal on the main journals and rod throws, and on the thrust bearing surfaces, of a worn crankshaft, wherein the heat of fusion causes stresses that result in distortion of the crankshaft, rough grinding said rod throws oversize and in proper lineal relation, and thereby substantially relieving the stresses resulting from the application of said fused metal coating, then finish grinding one of said thrust bearing surfaces in relation to said rough ground rod throws to the required lengthwise dimension from the neck of said crankshaft, and then finishing the other thrust bearing surface and said main journals and rod throws in relation to said first finish ground thrust bearing surface.

2. The process of reconditioning worn automotive crankshafts and the like which comprises fusing a surface coating of metal on the main journals and rod throws, and on the thrust bearing surfaces, of a worn crankshaft by electric welding, wherein the heat of fusion causes stresses that result in distortion of the crankshaft, rough grinding said rod throws oversize and in proper lineal relation, and thereby substantially relieving the stresses resulting from the application of said fused metal coating, then finish grinding one of said thrust bearing surfaces in relation to said rough ground rod throws to the required lengthwise dimension from the neck of said crankshaft, and then finishing the other thrust bearing surface, and then said rod throws, and finally said main journals, all in relation to said first finished ground thrust bearing surface.

3. The process of reconditioning worn automotive crankshafts and the like which comprises fusing a surface coating of metal on the main journals and rod throws, and on the thrust bearing surfaces, of a worn crankshaft by electric welding, wherein the heat of fusion causes stresses that result in distortion of the crankshaft, rough grinding said rod throws oversize and in proper lineal relation to each other and to the required lengthwise dimension from the neck of said crankshaft, and thereby substantially relieving the stresses resulting from the application of said fused metal coating, and finishing said rod throws and then said main journals and said thrust bearing surfaces all in relation to the proper lineal relation established for said rod throws.

4. The process of reconditioning worn automotive crankshafts and the like which comprises fusing a surface coating of metal on the main journals and rod throws, and on the thrust bearing surfaces, of a worn crankshaft by electric welding, wherein the heat of fusion causes stresses that result in distortion of the crankshaft, rough grinding said rod throws oversize and in proper lineal relation to each other and to the required lengthwise dimension from the neck of said crankshaft, and thereby substantially relieving the stresses resulting from the application of said fused metal coating, finishing said rod throws and said main journals in relation to the proper lineal relation established for said rod throws with respect to each other, and finishing said thrust bearing surfaces in relation to the required lengthwise dimension of said rod throws from the neck of said crankshaft.

CHARLES J. ALLEN, JR.

No references cited.